United States Patent
Kumagai

[11] Patent Number: 6,125,138
[45] Date of Patent: Sep. 26, 2000

[54] BASE STATION TRANSMITTER-RECEIVER

[75] Inventor: Yoshiaki Kumagai, Kawasaki, Japan

[73] Assignee: Fujitsu Limited, Kawasaki, Japan

[21] Appl. No.: 09/008,126

[22] Filed: Jan. 16, 1998

[30] Foreign Application Priority Data

Aug. 7, 1997 [JP] Japan ................................. 9-212364

[51] Int. Cl.[7] ................................. H04B 1/38; H04L 5/16
[52] U.S. Cl. ........................ 375/219; 375/354; 370/277; 370/288; 455/249.1
[58] Field of Search ................................ 375/219, 220, 375/354, 356; 370/276, 277, 278, 282, 288; 455/73, 249.1

[56] References Cited

U.S. PATENT DOCUMENTS

| | | | |
|---|---|---|---|
| 5,410,729 | 4/1995 | Kumagai et al. | 455/12.1 |
| 5,553,046 | 9/1996 | Horimai | 369/58 |
| 5,590,412 | 12/1996 | Sawai et al. | 455/82 |
| 5,669,066 | 9/1997 | Borg et al. | 455/69 |
| 5,697,081 | 12/1997 | Lyall, Jr. et al. | 455/249.1 |
| 5,768,694 | 6/1998 | Kumagai | 455/126 |
| 5,963,587 | 10/1999 | Kumagai | 375/219 |
| 5,974,040 | 10/1999 | Kimura | 370/337 |

*Primary Examiner*—Chi H. Pham
*Assistant Examiner*—Bryan Webster
*Attorney, Agent, or Firm*—Helfgott & Karas, P.C.

[57] ABSTRACT

In a case where transmission and reception timing of a base station has not been synchronized to that of another base station in the vicinity, or in a case where it is necessary to establish such synchronization, a synchronous controller outputs a reception-mode changeover signal to change the prevailing mode from an ordinary reception mode to a synchronous control reception mode. As a result, attenuating means attenuates a strong input signal from the other base station and enters the attenuated signal into a demodulator via a front end. The demodulator proceeds to demodulate the received data. The synchronous controller detects synchronization information (a synchronizing word) from the received data to synchronize the transmission and reception timings of the two base stations and then returns the reception mode to the ordinary reception mode.

10 Claims, 14 Drawing Sheets

| SIGNAL | STATE | Vcont1 | Vcont2 | D1 | D2 |
|---|---|---|---|---|---|
| PASS | ON | Vcc | 0 | CONDUCT | HIGH RESISTANCE |
| ATTENUATE | OFF | 0 | Vcc | HIGH RESISTANCE | CONDUCT |

FIG.10
| NAME | POWER TRANSMISSION AMPLIFIER | ANTENNA SWITCH | ATTENUATOR |
|---|---|---|---|
| ABBREVIATION | PA | ANT-SW | AT |
| AT TRANSMISSION | OPERATE | TRANSMISSION SIDE | ATTENUATE |
| AT RECEPTION | STOP OPERATING | RECEPTION SIDE | PASS |
FIG.11A
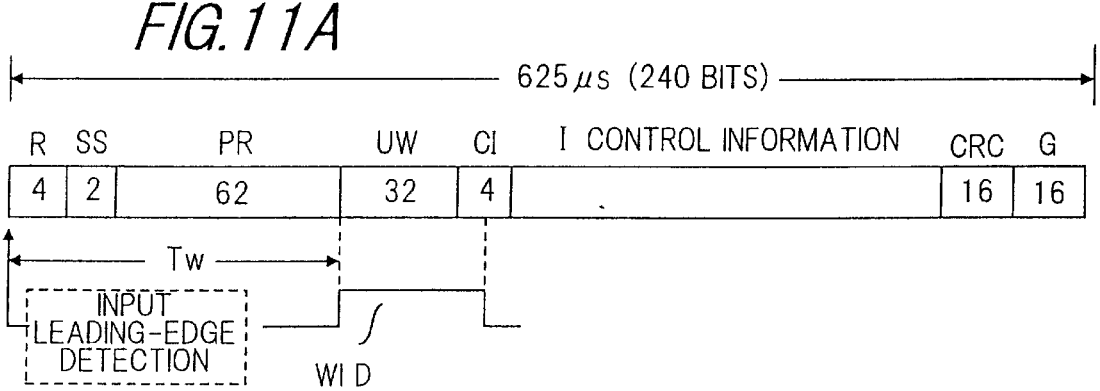
FIG.11B
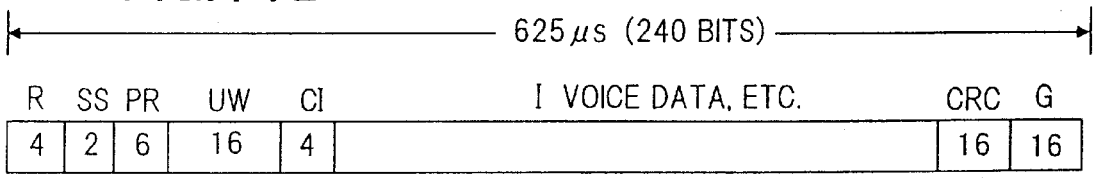
FIG.11C
| FOR CONTROL | UPLINK | (0110 1011 1000 1001 1001 1010 1111 0000) |
|---|---|---|
| | DOWNLINK | (0101 0000 1110 1111 0010 1001 1001 0011) |
| FOR COMMUNICATION | UPLINK | (1110 0001 0100 1001) |
| | DOWNLINK | (0011 1101 0100 1100) |

FIG.12

| MODE \ OPERATING LOCATION | NUMBER ABBREVI-ATION | TRANSMISSION POWER AMPLIFIER PA | ANTENNA SWITCH ANT-SW | ATTENUATOR AT |
|---|---|---|---|---|
| TRANSMISSION MODE | | OPERATE | TRANSMISSION SIDE | ATTENUATE |
| ORDINARY RECEPTION MODE | | STOP OPERATING | RECEPTION SIDE | PASS |
| SYNCHRONOUS CONTROL RECEPTION MODE | | STOP OPERATING | RECEPTION SIDE | ATTENUATE |

FIG.13

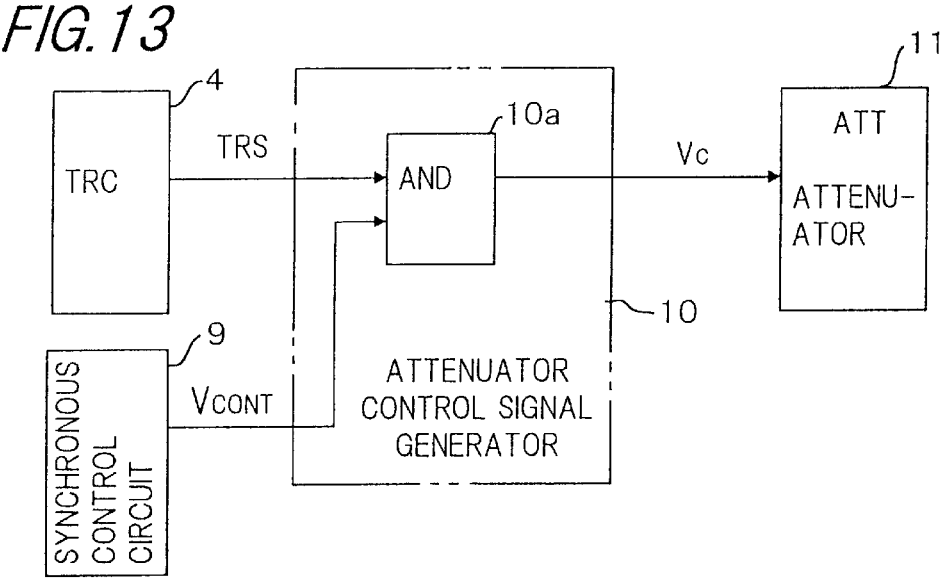

FIG.14

| MODE \ VARIOUS OUTPUTS | TRS | VCONT | Vc | ATTENUATOR |
|---|---|---|---|---|
| TRANSMISSION MODE | L | * | L | ATTENUATE |
| ORDINARY RECEPTION MODE | H | H | H | PASS |
| SYNCHRONOUS CONTROL RECEPTION MODE | H | L | L | ATTENUATE |

* Don't care.

FIG. 16

| MODE \ OPERATING LOCATION | NUMBER ABBREVIATION | TRANSMISSION POWER AMPLIFIER PA | ANTENNA SWITCH ANT-SW | ATTENUATOR AT |
|---|---|---|---|---|
| TRANSMISSION MODE | | OPERATE | TRANSMISSION SIDE | ATTENUATE |
| ORDINARY RECEPTION MODE | | STOP OPERATING | RECEPTION SIDE | PASS |
| SYNCHRONOUS CONTROL RECEPTION MODE | | STOP OPERATING | TRANSMISSION SIDE | PASS |

FIG. 17

| | OUTPUT TERMINALS | | | SWITCH CONTROL SIGNALS | | |
|---|---|---|---|---|---|---|
| MODE \ SWITCH | SWITCH 3a | SWITCH 3b | SWITCH 3c | SWC1 | SWC2 | SWC3 |
| TRANSMISSION | A | A | * | H | H | * |
| ORDINARY RECEPTION | B | B | * | L | L | * |
| SYNCHRONOUS CONTROL RECEPTION | A | A | * | H | H | * |

FIG. 18

| | | | SWITCH CONTROL SIGNALS | | |
|---|---|---|---|---|---|
| MODE \ SIGNAL | TRS | Vcont | SWC1 | SWC2 | SWC3 |
| TRANSMISSION | L | * | H | H | * |
| ORDINARY RECEPTION | H | H | L | L | * |
| SYNCHRONOUS CONTROL RECEPTION | H | L | H | H | * |

BASE STATION TRANSMITTER-RECEIVER

BACKGROUND OF THE INVENTION

This invention relates to a base station transmitter-receiver for repeating transmission and reception modes, transmitting a signal in the transmission mode and receiving a signal in the reception mode. More particularly, the invention relates to a transmitter-receiver of a base station for mobile communications utilizing TDD (time-division duplexing) in a system such as the PHS (Personal Handyphone System).

In order to reduce the load on hardware on the terminal side, achieve a reduction in size and weight and assure a long continuous standby time, the PHS implements two-way transmission of information by TDD.

TDD is duplexing that is accomplished by alternately transmitting and receiving signals using different time intervals for each signal. For example, in the case of PHS, transmitting-receiving timing in 4-channel multiplexed TDMA-TDD is as shown in FIG. 23. In one frame equivalent to 5 ms, four transmission slots (CH1 TX~CH4 TX) and four reception slots (CH1 RX~CH4 RX) of 625 $\mu$s are exchanged. In FIG. 23, CS (Cell Station) represents a base station, PS1~PS4 (PS: Personal Station) represent mobile slave stations, TS represents the duration of the transmission mode of the base station, and RS represents the duration of the reception mode of the base station. The base station CS transmits information to the four slave stations PS1~PS4 for 5 ms in the form of burst signals each having a duration of 625 $\mu$s. Each of the slave stations PS1~PS4 transmits its own information by a 625-$\mu$s burst 2.5 ms after receiving the signal from the base station CS.

When a number of PHS providers deploy base stations close together in the same area, as has happened recently, interference can result in transmission and reception. The reason for this is that there is no synchronization of frames between providers. Consequently, when base stations are set up independently, the transmission slots of the base station of a provider A can overlap the reception slots of the base station of a provider B, thereby impeding the reception of radio waves from the slave stations of provider B.

The simplest method of solving this problem is for the two base stations to transmit frame synchronizing signals to each other via a cable, with each station changing over transmission and reception timing in conformity with the frame synchronizing signal received. However, base stations usually are deployed independently of one another and the work involved in connecting base stations together is not easy even when the base stations are located in adjoining buildings. This approach, therefore, is not realistic. If it is attempted to transmit the frame synchronizing signal using ordinary lines, this in itself will result in the construction of a synchronizing network. This expedient is not economical.

A method referred to as "air synchronization" is used as one expedient to avoid the above-mentioned problem involving transmission of the synchronizing signal via cable. According to the air synchronization method, a base station that goes into operation at a later time receives radio waves from base stations that have already set up operation and begins operating in sync with these radio waves.

In the process of establishing synchronization of transmission and reception timing by air synchronization, it is required that operation different from the ordinary be performed, namely that a base station receive the radio waves that are emitted by another base station. A problem that arises is an excessively large input to the receiver of the base station. Since a base station produces a larger transmission output than a slave station, radio waves emitted from a base station a short distance away represent an excessively large input to the receiving base station. The result is a deterioration in the characteristic of the front-end low-noise amplifier, and the amplifier can be damaged in extreme cases. Since constructing a low-noise amplifier using devices that can withstand large inputs would invite a rise in the noise characteristic and lower reception sensitivity, this is not an effective solution to the problem. The problem set forth above will be confronted increasingly in situations where different PHS providers deploy their base stations in adjacent buildings or where a plurality of base stations are set up at one location in order to increase the number of subscribers by making use of a WLL (Wireless Local Loop).

SUMMARY OF THE INVENTION

Accordingly, an object of the present invention is to provide a base station transmitter-receiver in which it is possible to establish synchronization of transmission and reception timings between base stations using air synchronization, to prevent a deterioration in the characteristics of and damage to a low-noise amplifier and to avoid a decline in reception sensitivity.

Another object of the present invention is to provide a base station transmitter-receiver which eliminates limitations in terms of locations at which base stations can be deployed, thereby making it possible to deploy base stations effectively.

In accordance with the present invention, the foregoing objects are attained by providing a transmitter-receiver of a base station for repeating transmission and reception modes, transmitting a signal in the transmission mode and receiving a signal in the reception mode, the transmitter-receiver comprising a transmission power amplifier turned on in the transmission mode for inputting a transmission signal to an antenna and turned off in the reception mode, a front end for amplifying an antenna reception signal and frequency-converting the signal, a demodulator provided on an output side of the front end for demodulating data from the reception signal, attenuating means provided between the front end and the antenna for attenuating the reception signal in a synchronous reception mode, in which mode transmission and reception timing of this base station is synchronized to transmission and reception timing of another base station, and not attenuating the reception signal in an ordinary reception mode.

Further, in accordance with the present invention, the foregoing objects are attained by providing a transmitter-receiver of a base station for repeating transmission and reception modes, transmitting a signal in the transmission mode and receiving a signal in the reception mode, the transmitter-receiver comprising a transmission power amplifier turned on in the transmission mode and turned off in the reception mode, a front end for amplifying a reception signal and frequency-converting the signal, an antenna switch for connecting an antenna to a transmission side in a synchronous reception mode, in which mode transmission and reception timing of this base station is synchronized to transmission and reception timing of another base station, and in the transmission mode, and connecting the antenna to a reception side in an ordinary reception mode, a demodulator provided on an output side of the front end for demodulating data from the reception signal, and means provided between the front end and the antenna switch for attenuating an input signal in the transmission mode and passing the reception signal in the synchronous reception mode and in the ordinary reception mode.

Other features and advantages of the present invention will be apparent from the following description taken in conjunction with the accompanying drawings.

BRIEF DESCRIPTION OF THE DRAWINGS

FIG. 10 is a table useful in describing the operation of the components of a transmitting-receiving unit at the time of ordinary control;

FIG. 11A is a diagram useful in describing the format of a control slot, FIG. 11B is a diagram useful in describing the format of a communication slot, and FIG. 11C is a diagram useful in describing a synchronizing word;

FIG. 12 is a table useful in describing the operation of the components of a transmitter-receiver under synchronous control according to the first embodiment;

FIG. 13 is a block diagram showing the construction of an attenuator control signal generator;

FIG. 14 is a table useful in describing the relationship between modes and various signals;

FIG. 16 is a table useful in describing the operation of the components of a transmitter-receiver under synchronous control according to the second embodiment;

FIG. 17 is a table useful in describing switch output terminals and switch control signals in various modes;

FIG. 18 is a table useful in describing the relationship between signals TRS, $V_{CONT}$ and switch control signals in various modes;

DESCRIPTION OF THE PREFERRED EMBODIMENTS (A) Overview of the Invention (a) Overview of First Embodiment FIG. 1 is a block diagram of a base station transmitter-receiver for describing an overview of a first embodiment of the present invention.

Figure 1:
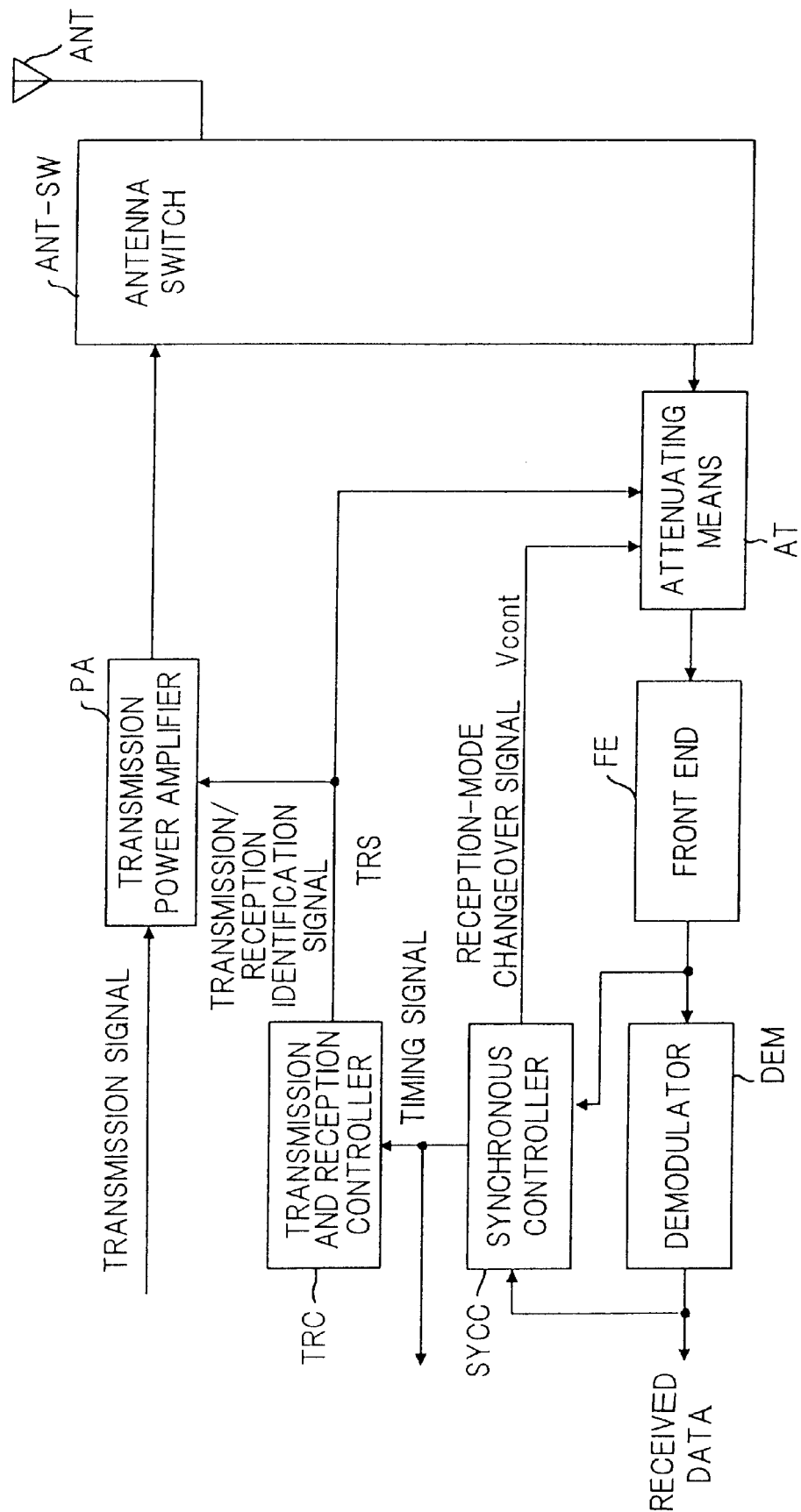
FIG. 1 is a block diagram for describing a first embodiment of the present invention.
Figure 23:
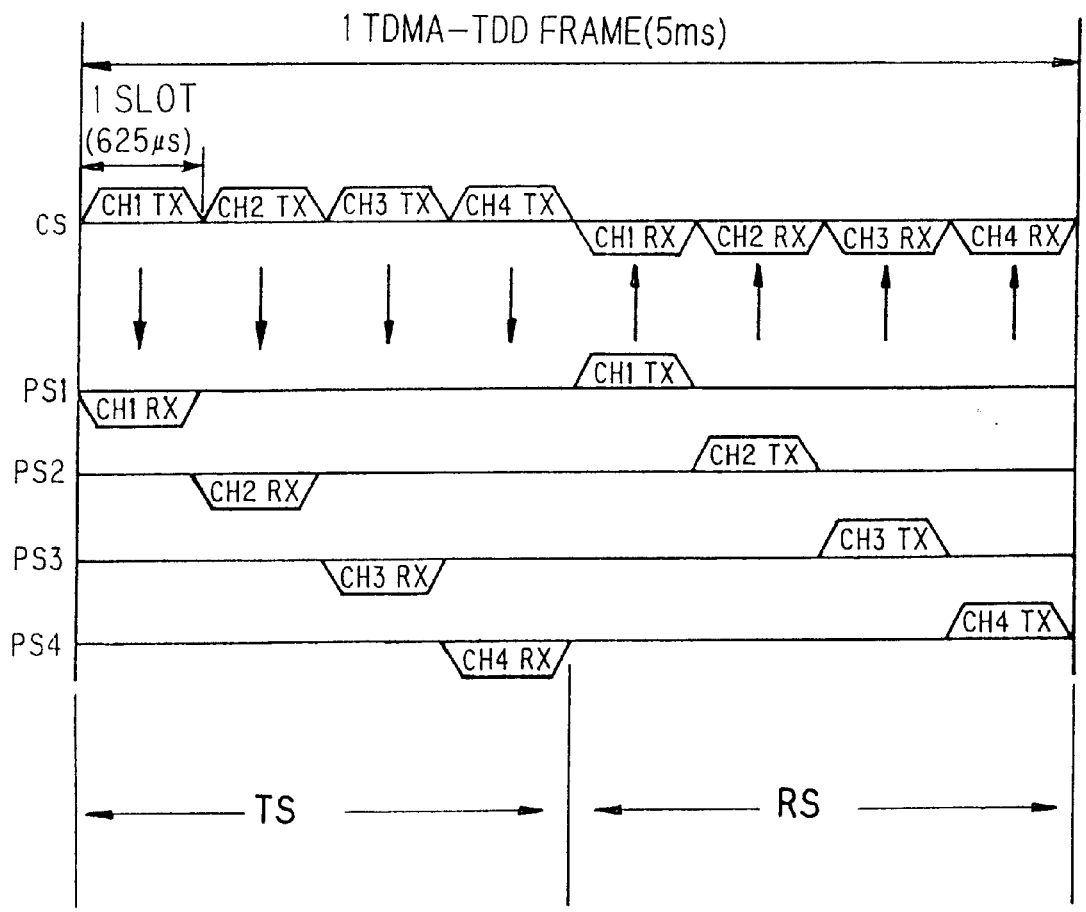
FIG. 23 is a diagram useful in describing transmission and reception timing in a 4-channel multiplexed TDMA-TDD system.

The apparatus shown in FIG. 1 includes a transmission power amplifier PA turned on in the transmission mode period TS (see FIG. 23) and turned off in the reception mode period RS, a front end FE for amplifying a reception signal and frequency-converting the signal, a demodulator DEM provided on the output side of the front end FE for demodulating data from the reception signal, an antenna ANT, an antenna switch ANT-SW for connecting the antenna ANT to a transmission side or reception side, attenuating means AT provided between the front end FE and the antenna ANT for either passing or attenuating an input signal, a transmission and reception controller TRC for generating a transmission/reception identification signal TRS which indicates whether the prevailing mode is the transmission mode or the reception mode, and a synchronous controller SYCC for generating a signal $V_{CONT}$ which specifies changeover between first and second reception modes (an ordinary reception mode and a synchronous control reception mode). The first reception mode is the ordinary reception mode and the second reception mode is the synchronous control reception mode for synchronizing the transmission and reception timing of this base station to the transmission and reception timing of another base station. In the synchronous control reception mode, a strong input signal from another station is received upon being attenuated, and synchronizing information contained in this received signal is used to synchronize this station to the other station. The attenuating means AT attenuates the input signal in the transmission mode interval, passes a received signal in the first reception mode (ordinary reception mode) at the time of reception and attenuates the received signal in the second reception mode (synchronous control reception mode).

In a case where transmission and reception timing of a base station has not been synchronized to that of another station at the same location or in the vicinity, or in a case where it is necessary to establish such synchronization, the synchronous controller SYCC outputs the reception-mode changeover signal $V_{CONT}$ to establish the second reception mode. As a result, the attenuating means AT attenuates a strong input signal from another station and enters the attenuated signal into the demodulator DEM via the front end FE. The demodulator DEM the proceeds to demodulate the received data. The synchronous controller SYCC detects the synchronization information from the received data to establish synchronization and then returns the reception mode to the first reception mode.

The attenuating means AT can be constituted by an attenuator or switch.

If this arrangement is adopted, it is possible to establish synchronization of transmission and reception timings between base stations using air synchronization. Moreover, since strong input signals from other stations are received upon being attenuated, it is possible to prevent a deterioration in the characteristics of and damage to the low-noise amplifier and to avoid a decline in reception sensitivity. Further, since the transmission and reception timing of the station can be synchronized to that of another station, it is possible to eliminate limitations in terms of locations at which base stations can be deployed, thereby making it possible to deploy base stations effectively.

(b) Overview of Second Embodiment

Figure 2:
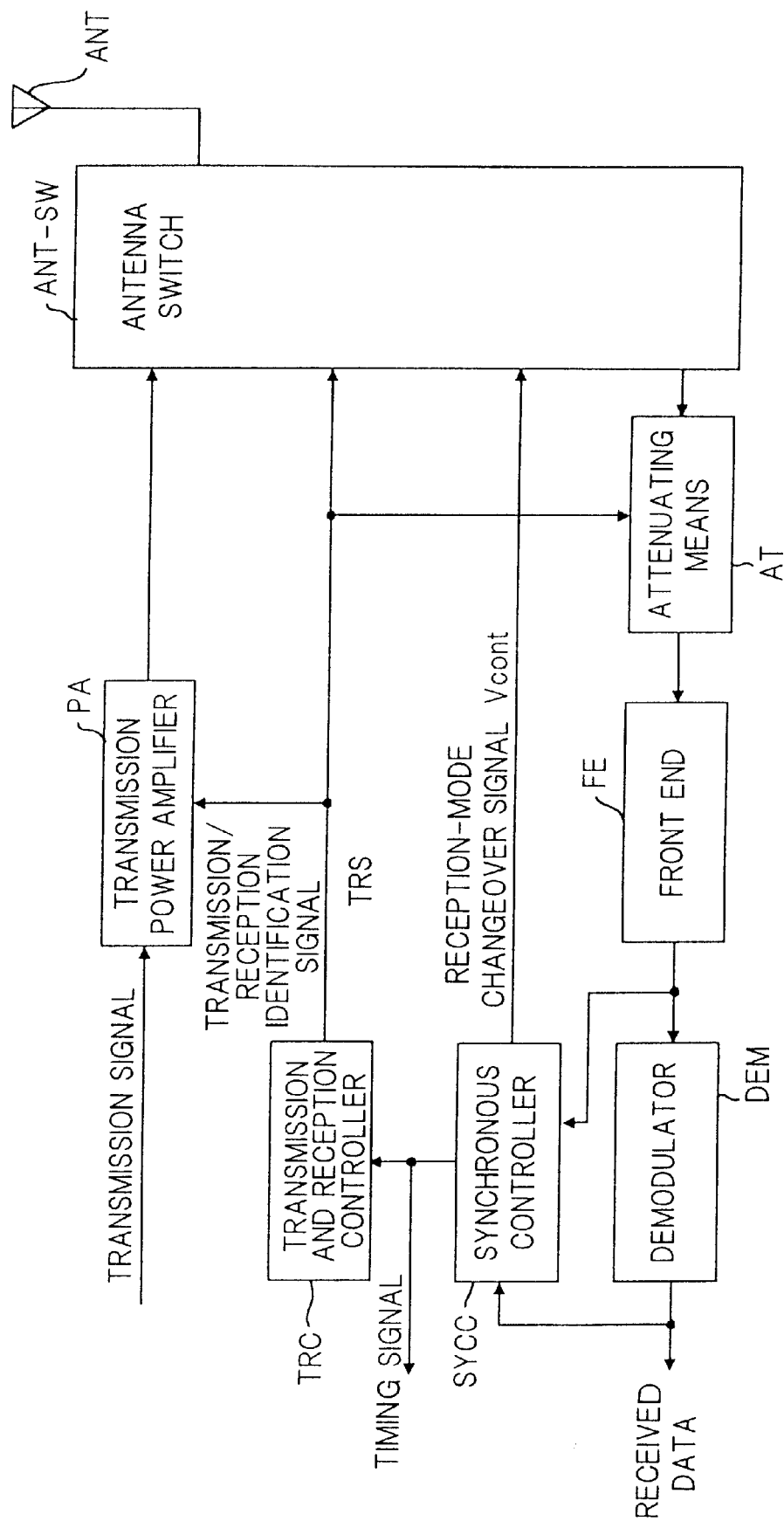
FIG. 2 is a block diagram for describing a second embodiment of the present invention.

FIG. 2 is a block diagram of a base station transmitter-receiver for describing an overview of a second embodiment of the present invention. Components identical with those shown in FIG. 1 are designated by like reference characters. This embodiment differs from that of the first embodiment in the method through which a received signal is attenuated in the second reception mode (synchronous control reception mode). In FIG. 1, the received signal is attenuated by the attenuating means AT (attenuator or switch) in the second reception mode. When the operating mode is the second reception mode in the embodiment of FIG. 2, however, the antenna ANT is connected not to the reception side but to the transmission side to thereby attenuate the received signal. In other words, a leakage signal within the switch is input to the front end to attenuate the received signal. It should be noted that when the prevailing mode is the first or second reception mode, the attenuating means AT allows the input signal to pass without attenuating it. The attenuating means AT performs the attenuating operation only at the time of transmission.

In a case where transmission and reception timing has not been synchronized to that of a station in the same or in an adjoining location, or in a case where it is necessary to establish synchronization, the synchronous controller SYCC outputs the reception-mode changeover signal $V_{CONT}$ to establish the second reception mode. As a result, the antenna switch ANT-SW connects ON the antenna ANT to the side of the transmitting circuit, not to the side of the receiving circuit. As a consequence, a strong input signal from another base station becomes leakage within the switch and is thus attenuated, the attenuated signal enters the demodulator DEM via the front end FE and the demodulator DEM demodulates the received data. The synchronous controller SYCC detects the synchronization information from the received data to establish synchronization and then returns the reception mode to the first reception mode.

If this arrangement is adopted, it is possible to establish synchronization of transmission and reception timings between base stations using air synchronization. Moreover, since strong input signals from other stations are attenuated within the switch, it is possible to prevent a deterioration in the characteristics of and damage to the low-noise amplifier and to avoid a decline in reception sensitivity. Further, since the transmission and reception timing of the station can be synchronized to that of another station, it is possible to eliminate limitations in terms of locations at which base stations can be deployed, thereby making it possible to deploy base stations effectively.

(B) First Embodiment (a) Overall Configuration

Figure 3:
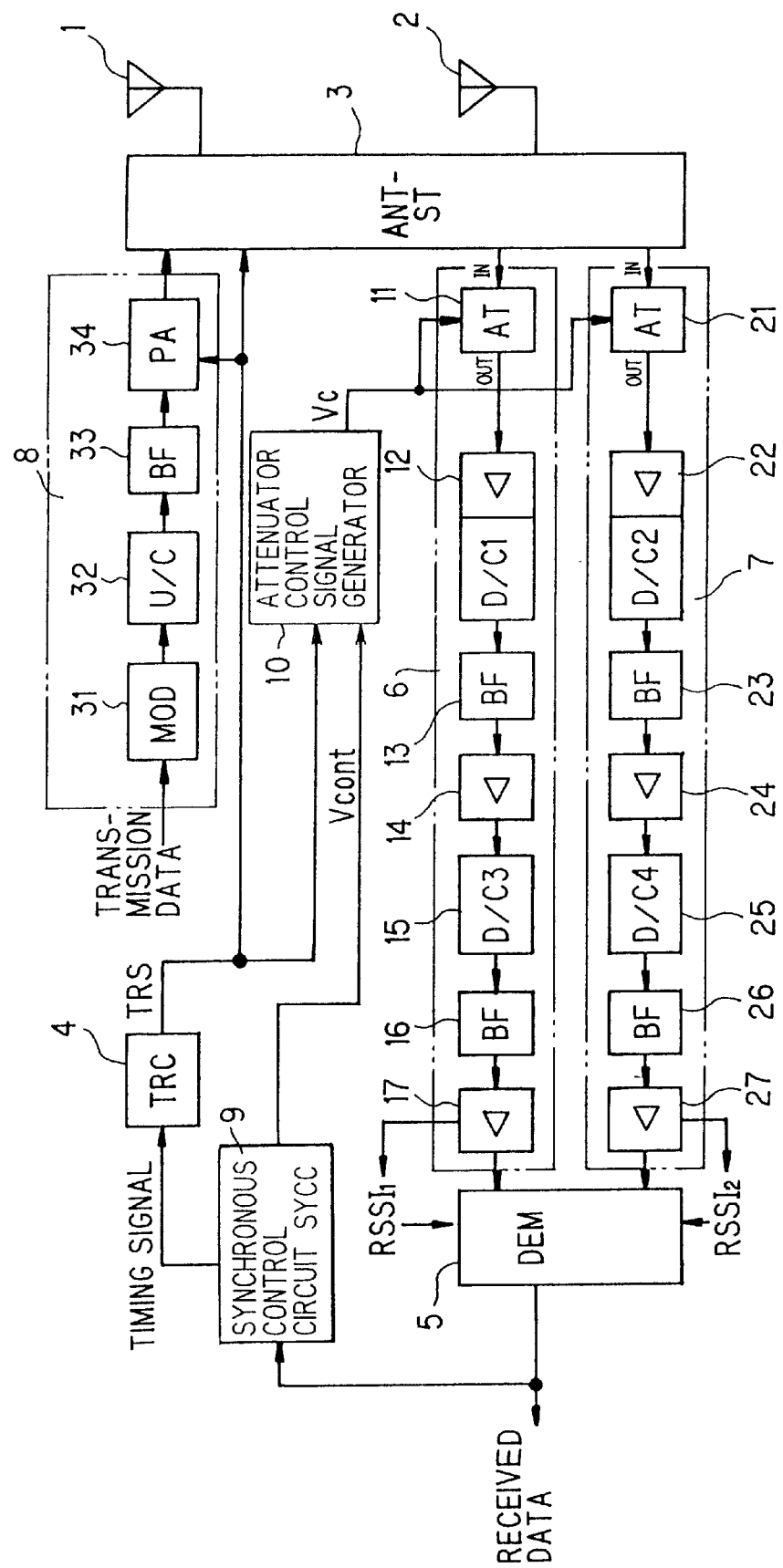
FIG. 3 is a block diagram illustrating a base station transmitter-receiver according to the first embodiment.

FIG. 3 is a block diagram illustrating a base station transmitter-receiver according to the first embodiment of the present invention. This illustrates an example in which the receiving system has two branches, namely first and second receiving systems. The apparatus has transmitting/receiving antennas 1, 2. The two antennas are provided for diversity reception. An antenna switch 3 connects the antennas 1, 2, each of which is used for both transmission and reception, to the transmitting system and receiving system by changing over between these systems in time-shared fashion. The antenna switch 3 connects the antenna 1 or 2 to the transmitting system in the transmission mode interval and connects the antennas 1, 2 to first and second receiving systems, respectively, in the reception mode interval. A transmission and reception controller (TRC) 4 is provided with a timing signal as an input and outputs a transmission/reception identification signal TRS which assumes a low level in the transmission mode interval TS (see FIG. 23) and a high level in the reception mode interval RS. A demodulator (DEM) 6 demodulates received data by QPSK demodulation processing. The first receiving system, second receiving system and the transmitting system, mentioned above, are indicated at numerals 6, 7 and 8, respectively. A synchronous control circuit 9 synchronizes the transmission and reception timing of this station to the transmission and reception timing of another station and outputs the reception-mode changeover signal $V_{CONT}$. An attenuator control signal generator 10 generates an attenuator control signal Vc.

The first and second receiving systems 6, 7 have variable-attenuation attenuators 11, 21, respectively, for attenuating a transmission signal that has leaked in from the antenna switch 3 at the time of transmission, and allows a reception signal, which has been received by the antennas 1, 2, to pass at the time of reception. The attenuators 11, 21 maximize attenuation when the transmission/reception identification signal TRS is at the low level (i.e., when the prevailing mode is the transmission mode) and minimize attenuation when the transmission/reception identification signal TRS is at the high level (i.e., when the prevailing mode is the reception mode). This prevents leakage of transmitted waves from the antenna switch 3 from being applied to the front end as an excessively large input at the time of transmission, thereby preventing deterioration in the characteristics of and damage to the front end.

The front ends (FE) of the first and second receiving systems 6, 7 are indicated at numerals 12, 22 and have low-noise RF amplifiers and frequency converters (D/C1, D/C2, respectively). These amplify a received signal in the 1.9-GHz band and then frequency-convert the signal to a first intermediate frequency signal in the 250-MHz band. Bandpass filters 13, 23 pass the first intermediate frequency signal and amplifiers 14, 24 amplify the first intermediate frequency signal. Frequency converters (D/C3, D/C4) 15, 25 down-convert the first intermediate frequency signal of the 250-MHz band to a second intermediate frequency signal of the 10-MHz band. The outputs of the frequency converters 15, 25 are connected to bandpass filters 16, 26, respectively. Limiter amplifiers 17, 27 amplify the second intermediate frequency signal and output signals RSSI (received signal strength indicator), which are proportional to the reception electric field strengths of the antennas 1, 2, respectively.

The demodulator 5 combines the second intermediate frequency signals from the limiter amplifiers 17, 27 by the maximal-ratio combining method and then performs QPSK demodulation to demodulate and output the received data. The synchronous control circuit 9 detects a synchronizing word UW from the received data output by the demodulator 5 and synchronizes the transmission and reception timing of the station to the transmission and reception timing of another station based upon the results of detection.

The transmitting system 8 includes a quadrature modulator 31 for QPSK-modulating a carrier signal by transmission data, a frequency converter 32 for up-converting the quadrature-modulated signal to the 1.9-GHz band, a bandpass filter 33 for passing a 1.9-GHz band radio signal, and a transmission high-output amplifier (transmission power amplifier PA) 34 for power amplifying the radio signal and transmitting the amplified signal into space from the antenna 1 or 2 via the antenna switch 3.

(b) Attenuators

Figure 4:
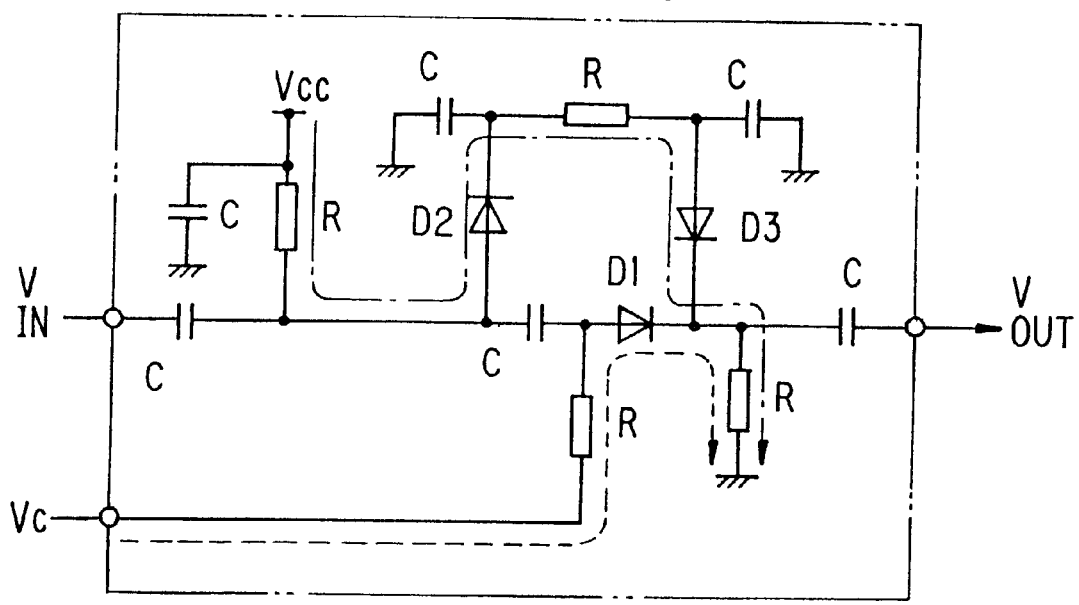
FIG. 4 is a diagram showing the circuit arrangement of an attenuator.
Figure 5:
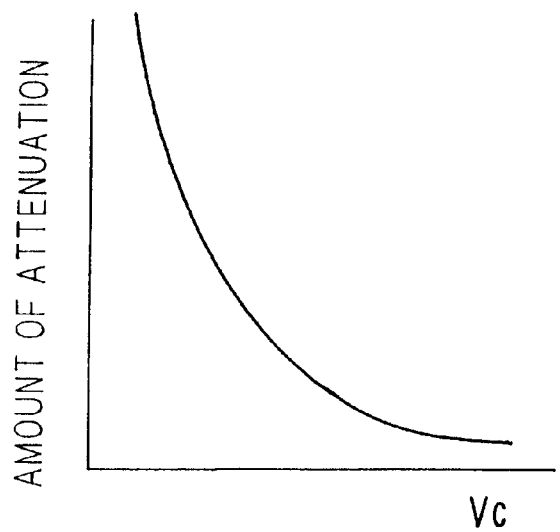
FIG. 5 is a graph showing the relationship between control voltage Vc and amount of attenuation of the attenuator.

FIG. 4 shows an example of the circuitry of attenuators 11 and 21. The circuitry is designed in such a manner that amount of attenuation diminishes as the control signal Vc increases, as illustrated in FIG. 5. More specifically, when the control signal Vc is made large, a DC path indicated by the dashed line in formed and a diode D1 is forward biased. Consequently, a signal $V_{IN}$ that has entered an input terminal is transmitted from an output terminal as $V_{OUT}$ via the diode D1 without being attenuated. When the control signal Vc is made small, on the other hand, a DC path indicated by the one-dot chain line is formed and the input signal $V_{IN}$ is output from the output terminal via the following path: capacitor C, diode D2, resistor R, diode D3 and capacitor C. The amount of attenuation is increased as a result. Accordingly, the degree of attenuation of the attenuator can be controlled to have two values by placing the control voltage Vc at the high level H or low level L.

Figures 6, 7:
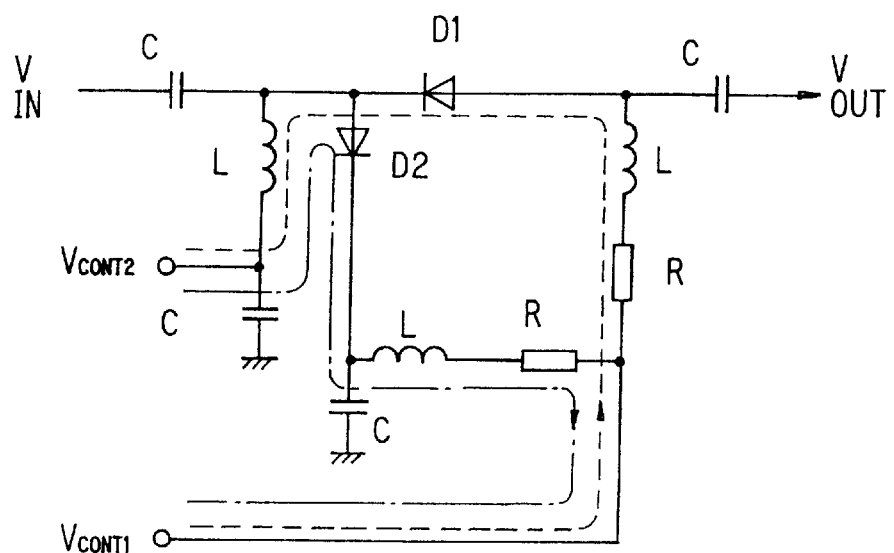
FIG. 6 is a diagram showing another circuit arrangement of an attenuator.
FIG. 7 is a table useful in describing the operation of the circuit shown in FIG. 6.

FIG. 6 shows another example of the attenuator circuitry. Here the input signal $V_{IN}$ is passed or attenuated by a switch-like operation. To establish the state in which the input signal is allowed to pass, a first control signal $V_{CONT1}$ is placed at the high level (=$V_{CC}$) and a second control signal $V_{CONT2}$ is placed at the low level (=0), as illustrated in FIG. 7. If the first and second control signals $V_{CONT1}$, $V_{CONT2}$ are thus biased, a DC path is formed in the direction of the arrow indicated by the dashed line, the diode D1 is rendered conductive and the diode D2 is rendered non-conductive. The input signal $V_{IN}$ is therefore transmitted from the output terminal as $V_{OUT}$ via the diode D1. To establish the state in which the input signal is attenuated, on the other hand, the first control signal $V_{CONT1}$ is placed at the low level (=0) and a second control signal $V_{CONT2}$ is placed at the high level (=$V_{CC}$). If the first and second control signals $V_{CONT1}$, $V_{CONT2}$ are thus biased, a DC path is formed in the direction of arrow indicated by the one-dot chain line, the diode D2 is rendered conductive and the diode D1 is rendered non-conductive. As a result, the input signal $V_{IN}$ is attenuated and does not appear at the output terminal.

(c) Antenna Switch

Figure 8:
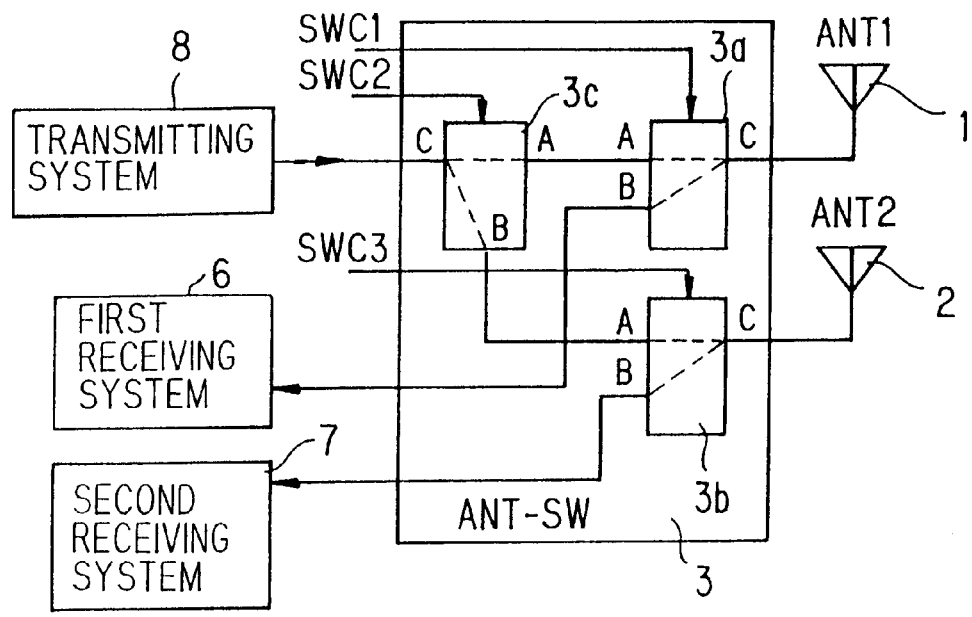
FIG. 8 is a diagram showing the construction of an antenna switch.

FIG. 8 is a diagram showing the construction of the antenna switch 3. The antenna switch 3 has three internal switches 3a~3c and is adapted to connect the antenna 1 or 2 to the transmitting system 8 or antennas 1, 2 to the first and second transmitting systems 6, 7, respectively. The switches 3a~3c each have a C terminal to which a signal is applied, terminals A and B for selectively outputting the signal, and a control terminal for controlling which of the terminals A, B outputs the signal.

Figure 9:
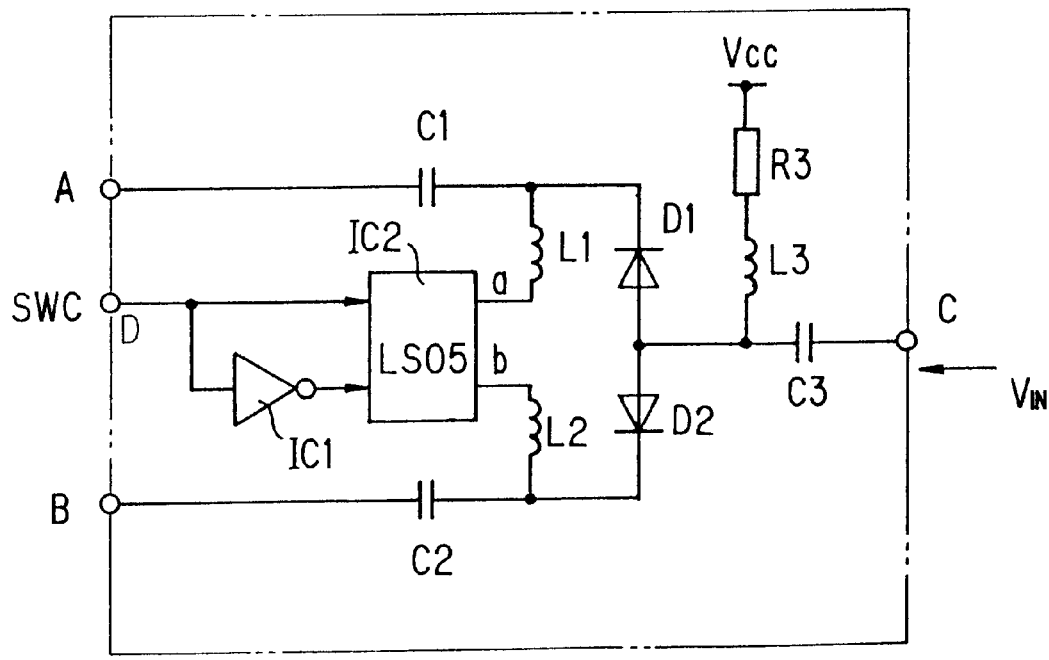
FIG. 9 is a diagram showing the circuit arrangement of a switch used to construct the antenna switch.

FIG. 9 is a diagram showing an example of the construction of the switches constituting the antenna switch 3. The switch has a NOT gate IC1 and an IC circuit IC2. The IC circuit IC2 outputs a low-level signal at a terminal a and a high-level signal at a terminal b when a control signal SWC is at the high level, and outputs a high-level signal at the terminal a and a low-level signal at the terminal b when the control signal SWC is at the low level. Accordingly, if the control signal SWC is at the high level, a diode D1 is forward biased and a diode D2 is reverse biased so that the signal $V_{IN}$ that has entered from the terminal C is output from the terminal A. Conversely, if the control signal SWC is at the low level, the diode D1 is reverse biased and the diode D2 is forward biased so that the signal $V_{IN}$ is output from the terminal B.

(d) Ordinary Control

FIG. 10 is a table useful in describing the operation of the transmission power amplifier 34, antenna switch 3 and attenuators 11, 21 in the ordinary transmission mode and reception mode.

More specifically, the transmission power amplifier 34 performs an amplifying operation at the time of transmission (when the transmission/reception identification signal TRS is at the low level) and halts the amplifying operation at the time of reception (when the transmission/reception identification signal TRS is at the high level). Further, the antenna switch 3 connects the antenna 1 or 2 to the transmitting system 8 at the time of transmission and connects the antennas 1, 2 to the first and second receiving systems 6, 7, respectively, at the time of reception. The attenuators 11, 21 perform an attenuating operation at the time of transmission, whereby a transmission signal which leaks into the first and second receiving systems via the antenna switch 3 is attenuated, and do not attenuate a reception signal, which has been received by the antennas 1, 2, at the time of reception, whereby the signals enters the front ends 12, 22 without being attenuated.

The reason for having the attenuators 11, 21 perform the attenuating operation at the time of transmission is to prevent the transmission signal amplified by the transmission power amplifier 34 from leaking to the receiving side and causing deterioration in the characteristics of or damage to the front ends 12, 22. For example, the transmission output within a burst is on the order of +29 dBm on average. Even if the output is attenuated by 30 dB by isolation of the antenna switch 3, approximately 0 dBm acts upon the receiving system. On the other hand, the maximum withstand input level of the front ends 11, 22 often is about −20 dBm. Accordingly, the attenuators 11, 21 are inserted on the input side of the front ends and perform the attenuating operation at the time of transmission to attenuate leakage of the transmitted waves and protect the front ends.

When the transmission/reception identification signal TRS assumes the low level at the time of transmission, the transmission power amplifier (PA) 34 performs amplification, the antenna switch 3 connects the transmitting system 8 with either antenna 1 or 2 and the attenuators 11, 21 perform attenuation. As a result, the radio signal power-amplified by the transmission power amplifier 34 is transmitted into space from antenna 1 or 2 and leakage of the transmission signal is attenuated by the attenuators 11, 21.

When the transmission/reception identification signal TRS assumes the high level at the time of reception, the transmission power amplifier (PA) 34 stops amplifying, the antenna switch 3 connects the antennas 1 and 2 to the first and second receiving systems 6 and 7, respectively, and the attenuators 11, 21 allow the signals to pass. As a result, the reception signal received by each of the antennas 1, 2 is amplified and frequency-converted before entering the demodulator 5. The latter combines the signals, which have entered from the first and second receiving systems, by the maximal-ratio combining method and then performs QPSK demodulation to demodulate and output the received data.

(e) Synchronous Control

In a case where, say, a plurality of base stations are deployed at one location (e.g., on both sides of the same telephone pole) by a wireless local loop or the like, the transmitted waves of a base station CS that went into operation first are calculated when they reach another base station CS at a maximum of −5 dBm. A base station CS that has gone into operation at a later time without being in synchronization with the earlier base station will be exposed to an excessively large input at the time of reception.

The present invention, by controlling the attenuating operation of the attenuators 11, 12 when a base station CS goes into operation, protects the front ends 12, 22 until establishment of synchronization by not allowing an excessively large input to be applied to them.

(e-1) Establishing Synchronization

A transmission slot (see FIG. 23) contains (1) a control slot (CH1 TX) for the transmission of broadcast information, paging information and control information necessary for call connection, and (2) communication slots (CH2 TX~CH TX4) for transmission of user information such as voice data. A base station CS transmits control information to a slave station in the control slot in accordance with the format shown in FIG. 11A, and transmits voice data or the like to the slave station in the communication slots in accordance with the format shown in FIG. 11B.

In the formats shown in FIGS. 11A, 11B, R represents 4-bit transient response ramp time (burst transient response time) for assuring rise time, SS represents a start symbol (fixed at 10) indicative of a start signal, PR denotes a preamble for reproducing a clock from a received signal and establishing bit synchronization between base and slave stations, and UW represents a synchronizing word for synchronizing frames. As shown in FIG. 11C, the pattern stipulated differs depending upon whether the control slot is an uplink or downlink slot and whether the communication slot is an uplink or downlink slot. Further, CI denotes a channel identifier which indicates the particular channel (a broadcast channel, paging channel, signaling channel or traffic channel, etc.) sending information in the relevant slot, I represents an information field such as control information or voice data, and CRC represents an error detection bit.

The synchronizing word UW is generated upon elapse of different times from the beginning of the control slot and communication slots. If a window WID having a duration corresponding to UW and CI is set to start from a time Tw following detection of the leading edge of the input and the UW bit pattern of a downlink control slot is detected within the window WID, as shown in FIG. 11A, it can be determined that the timing of the leading edge is the beginning of the transmission period TS (see FIG. 23). In other words, in case of 4-channel multiplexed TDMA-TDD, the downlink control channel is situated at the leading slot (CH1 TX) and therefore the timing of the above-mentioned leading edge becomes the timing of the leading edge of the transmission period TS of the other base station.

In accordance with the foregoing, therefore, if a transmission signal from a base station B is received by a base station A and the timing of the leading edge of the transmission period TS is detected by the foregoing method, the transmission and reception timing of the base station A can be synchronized to the transmission timing of the transmitter-receiver of the base station B.

(e-2) Synchronization Control of First Embodiment

In addition to the ordinary reception mode, there is provided a reception mode (synchronous control reception mode) for synchronizing the transmission and reception timing of the base station to the transmission and reception timing of another base station. In the transmission mode, ordinary reception mode and synchronous control reception mode, the transmission power amplifier 34, antenna switch 3 and attenuators 11, 21 are controlled in accordance with the table of FIG. 12, which is useful in describing operation. Specifically, at the time of transmission and ordinary reception, the transmission power amplifier 34, antenna switch 3 and attenuators 11, 21 are controlled in the same manner as indicated in the table of FIG. 10. In the synchronous control reception mode, however, control is carried out in such a manner that a strong input signal from another base station is attenuated and the synchronous control circuit 9 is capable of detecting the UW bit pattern. In the synchronous control reception mode, therefore, the antennas 1, 2 are connected to the first and second receiving systems 6, 7, respectively, and the attenuators 11, 21 are caused to perform attenuation. Amplification by the transmission power amplifier 34, however, is halted.

In the synchronous control reception mode, excessively large inputs to the front ends 12, 22 can be attenuated by 20~30 dB by the attenuating operation of the attenuators 11, 21, thereby making it possible to prevent a deterioration in the characteristics of and damage to the low-noise amplifiers constituting the front ends. Accordingly, a strong signal transmitted by another base station is received and attenuated, after which the attenuated signal is frequency-converted and amplified and then applied to the demodulator 5. The latter demodulates and outputs the received data. The synchronous control circuit 9 detects the synchronizing word UW from the received data and synchronizes the transmission and reception timing of its own base station with that of the other base station.

(e-3) Signal Attenuation/Passage Control of Attenuators

FIG. 13 is a block diagram showing the construction of the attenuator control signal generator 10 which causes the attenuators 11, 21 to pass or attenuate a signal in accordance with the table shown in FIG. 12. As shown in FIG. 13, the transmission and reception controller 4 outputs the transmission/reception identification signal TRS which assumes the low level for the duration of the transmission mode and the high level for the duration of the reception mode. The synchronous control circuit 9 outputs the mode changeover signal $V_{CONT}$, which effects the changeover between the ordinary reception ode and the synchronous control reception mode. The attenuator control signal generator 10 generates the attenuator control signal Vc. The attenuator 11 has the construction illustrated in FIG. 4. The attenuator control signal generator 10 has an AND gate 10a which takes the logical product between the transmission/reception identification signal TRS and the mode changeover signal $V_{CONT}$ and outputs the attenuator control signal Vc.

The attenuator 11 allows its input signal to pass when the attenuator control signal Vc is at the high level H and attenuates the input when the signal Vc is at the low level L, as obvious from FIG. 4. In order to control the attenuator 11 in accordance with the table shown in FIG. 12, it is required that the attenuator control signal Vc set as follows:

(1) Vc=low level L in the transmission mode;

(2) Vc=high level H in the ordinary reception mode; and (3) Vc=low level L in the synchronous control reception mode.

Accordingly, as shown in FIG. 14, the synchronous control circuit 9 (1) sets the mode changeover signal $V_{CONT}$ to the high level H in the ordinary reception mode, and (2) sets the mode changeover signal $V_{CONT}$ to the low level L in the synchronous control reception mode. In the transmission mode, the mode changeover signal $V_{CONT}$ may be either H or L. As a result, the attenuator control signal generator 10 takes the AND between the transmission/reception identification signal TRS and mode changeover signal $V_{CONT}$, generates the attenuator control signal Vc in each mode in the manner shown in FIG. 14 and controls the attenuators 11, 21 by the control signal Vc in such a manner that the attenuators will pass or attenuate there inputs in accordance with the table shown in FIG. 12.

(C) Second Embodiment (a) Overall Configuration

Figure 15:
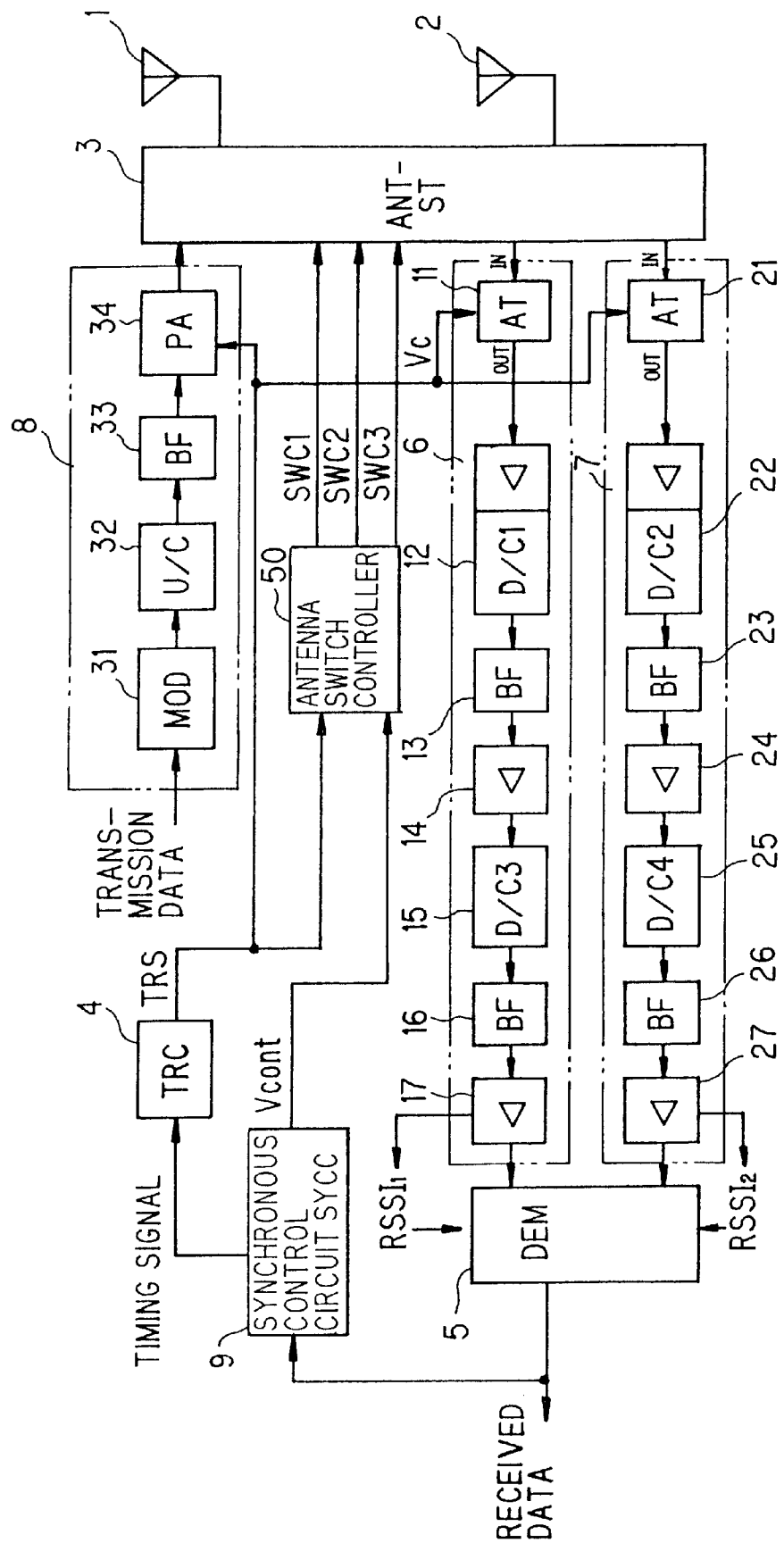
FIG. 15 is a block diagram illustrating a base station transmitter-receiver according to the second embodiment.

FIG. 15 is a block diagram illustrating a base station transmitter-receiver according to the second embodiment of the present invention. Components identical with those shown in FIG. 1 are designated by like reference characters. This embodiment differs from the first embodiment of FIG. 3 in that (1) the attenuator control signal generator 10 is eliminated and an attenuator switch 50 is provided instead, (2) each of the components of the transmitter-receiver are controlled in accordance with the table shown in FIG. 16, and (3) in the synchronous control reception mode the attenuators are connected to the transmitting system and not the receiving system to attenuate the received signal.

(b) Synchronous Control

According to the second embodiment, the transmission power amplifier 34, antenna switch 3 and attenuators 11, 21 are controlled in accordance with the table shown in FIG. 16 in the transmission mode, ordinary reception mode and synchronous control reception mode. That is, at the time of transmission and ordinary reception, the transmission power amplifier 34, antenna switch 3 and the attenuators 11, 21 are controlled in the same manner as indicated in the table of FIG. 10. In the synchronous control reception mode, however, control is carried out in such a manner that a strong input signal from another base station is attenuated and the synchronous control circuit 9 is capable of detecting the UW bit pattern. In the synchronous control reception mode, therefore, the antennas 1, 2 are connected to the transmitting system 8 and not to the first and second receiving systems 6, 7. If this arrangement is adopted, a strong input signal, even if one is received from another base station, will not enter the receiving system directly. In other words, even if a leakage signal from the antenna switch 3 becomes the input to the first and second receiving systems 6, 7 and attenuation is not performed by the attenuators 11, 21, a strong input signal from the other base station will attenuated. By virtue of this attenuating operation, an excessively large input to the front ends 12, 22 can be attenuated by 20~30 dB, thereby making it possible to prevent a deterioration in the characteristics of and damage to the low-noise amplifiers constituting the front ends.

Thus, a signal transmitted from another base station is attenuated by the antenna switch 3, after which the attenuated signal is frequency-converted, amplified and input to the demodulator 5. The latter demodulates and outputs the received data. The synchronous control circuit 9 detects the synchronizing word UW from the received data and synchronizes the transmission and reception timing of its own base station with that of the other base station.

(c) Attenuator Switch Changeover Control

FIG. 17 is a table illustrating the logic (H, L) of signal output terminals and switch control signals for controlling the three switches 3a~3c, which constitutes the antenna switch 3 (see FIG. 8), in accordance with the table shown in FIG. 16.

It is required that the antenna 1 or 2 be connected to the transmitting system at the time of transmission. Accordingly, the signal output terminals of the switches 3a, 3b, 3c are made A, A, *, respectively. Here "*" means that it does not matter whether the output terminal is A or B. It is required that the antennas 1 and 2 be connected to the first and second receiving systems 6, 7, respectively, at the time of reception. Accordingly, the signal output terminals of the switches 3a, 3b, 3c are made B, B, *, respectively. The antennas 1 and 2 are not connected to the first and second receiving systems 6, 7 in the synchronous control reception mode. In this case, therefore, the signal output terminals of the switches 3a, 3b, 3c are made A, A, *, respectively.

It should be obvious from FIG. 9 that an input signal appears at the terminal A of the switches 3a~3c when the control signal SWC is at the high level H and at the terminal B when the control signal SWC is at the low level L. Accordingly, if it is assumed that the switches 3a~3c select the output terminals A, B, as indicated on the left side of FIG. 17, it will be necessary for the antenna switch controller 50 to produce the control signals SWC1~SWC3 at the levels indicated on the right side of FIG. 17.

At the time of transmission, ordinary reception and synchronous control reception, the transmission/reception identification signal TRS and the reception mode changeover signal $V_{CONT}$ are as shown in FIG. 18. Accordingly, the antenna switch controller 50 performs control in such a manner that the switch control signals SWC1~SWC3 at the time of transmission, ordinary reception and synchronous control reception are output based upon the combination of the transmission/reception identification signal TRS and reception mode changeover signal $V_{CONT}$.

More specifically, at the time of transmission when TRS=L holds, the antenna switch controller 50 sets SWC1, SWC2 to the high level and SWC3 to either level. At the time of ordinary reception when TRS=H, $V_{CONT}$=H hold, the antenna switch controller 50 sets SWC1, SWC2 to the low level and SWC3 to either level. Further, in the synchronous control reception mode when $V_{CONT}$=L holds, the antenna switch controller 50 sets SWC1, SWC2 to the high level (and SWC3 to either level), thereby attenuating the received signal before it is input to the first and second receiving systems.

(D) Synchronous Control at Start-up of Base Station

Figure 19:
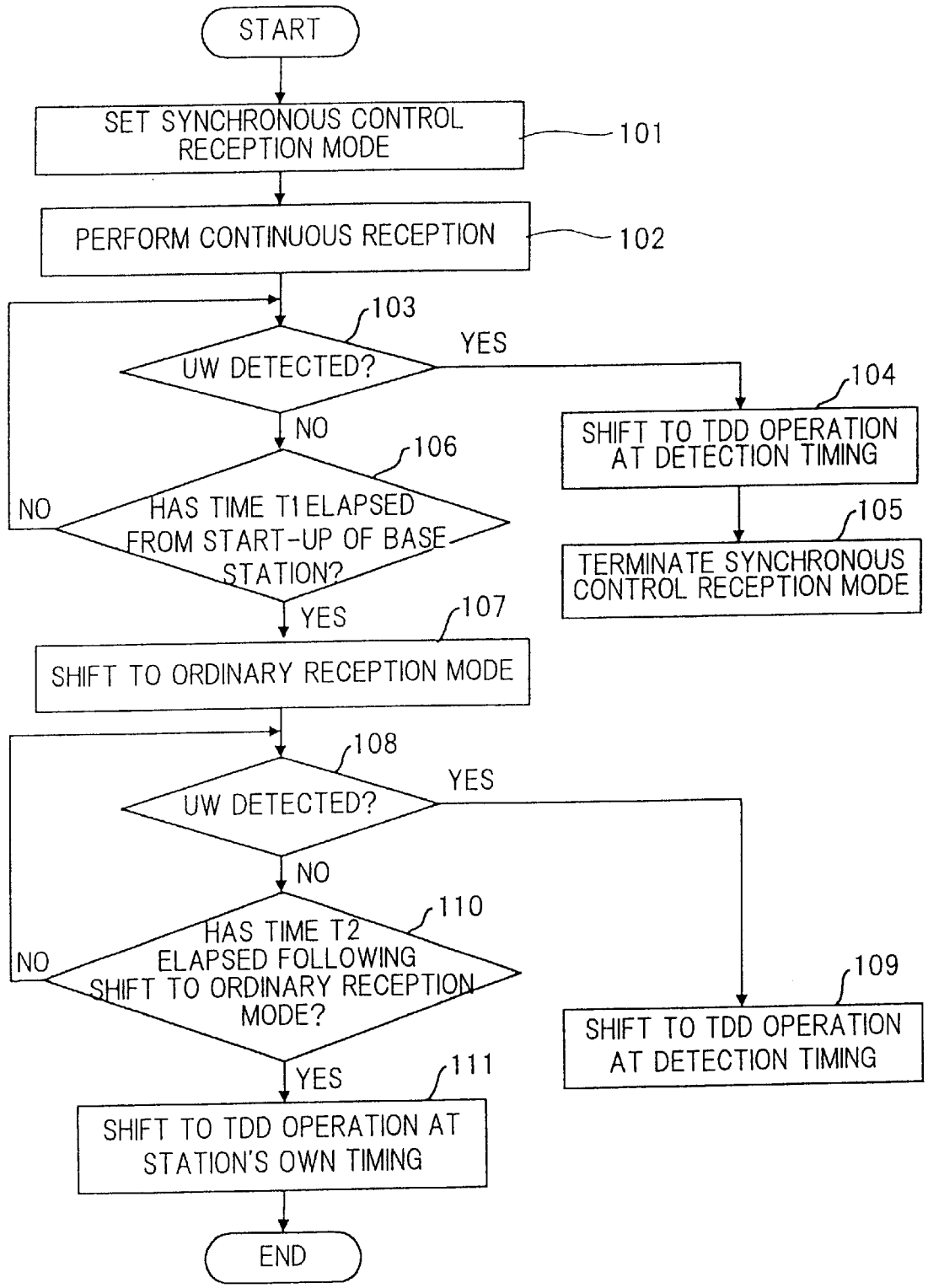
FIG. 19 is a flowchart of synchronous control processing.

FIG. 19 is a flowchart of synchronous control processing from start-up of a base station to the beginning of ordinary operation in accordance with the first or second embodiment.

When a base station starts up, the synchronous control reception mode is established (step 101). That is, the synchronous control circuit 9 outputs the mode changeover signal $V_{CONT}$ at the L level. As a result, the received signal is attenuated by the attenuators 11, 21 (according to the first embodiment) or by the attenuator switch 3 (according to the second embodiment) irrespective of the level of the transmission/reception identification signal TRS. Further, while the mode changeover signal $V_{CONT}$ is at the low level L, control is performed so as to connect the antennas 1, 2 to the first and second receiving systems (according to the first embodiment) or so as not connect the antennas 1, 2 to the first and second receiving systems (according to the second embodiment) in order that the receiving operation may be performed continuously (step 102).

Next, the synchronous control circuit 9 determines whether the synchronizing word UW could be detected (step 103). If the decision rendered is "YES", then the transmission and reception timing of its own station is decided based upon the detection timing and TDD operation begins (step 104). Next, the synchronous control circuit 9 sets the mode changeover signal $V_{CONT}$ to the high level and then makes the reception mode the ordinary reception mode (step 105).

If the decision rendered at step 103 is that the synchronizing word UW could not be detected, then the synchronous control circuit 9 determines whether a set time T1 has elapsed from start-up of the base station (step 106). If the time T1 has not elapsed, then the processing is continued from step 103.

If the synchronizing word UW cannot be detected even upon elapse of the set time T1, the synchronous control circuit 9 sets the mode changeover signal $V_{CONT}$ a to the high level and makes the reception mode the ordinary reception mode (step 107).

Thereafter, with the received signal in the unattenuated state, the synchronous control circuit 9 determines whether the synchronizing word UW could be detected (step 108). If the synchronizing word UW could be detected, the synchronous control circuit 9 decides the transmission and reception timing of its own station based upon the detection timing and the TDD operation begins (step 109). On the other hand, if the synchronizing word UW could not be detected at step 108, then the synchronous control circuit 9 determines whether a set time T2 has elapsed since the transition to the ordinary reception mode (step 110). If the decision rendered is "NO", then processing is continued from step 108.

If the synchronizing word UW fails to be detected upon elapse of the set time T2, then a transition is made to the TDD operation at the timing of this base station.

(E) Third Embodiment

A third embodiment of the invention is so adapted that when an input larger than a fixed value is detected in a reception time slot of the ordinary reception mode, it is judged that the base station is not synchronized to other base stations at the same location or in neighboring locations and synchronous control is carried out upon making a transition to the synchronous control reception mode.

Figure 20:
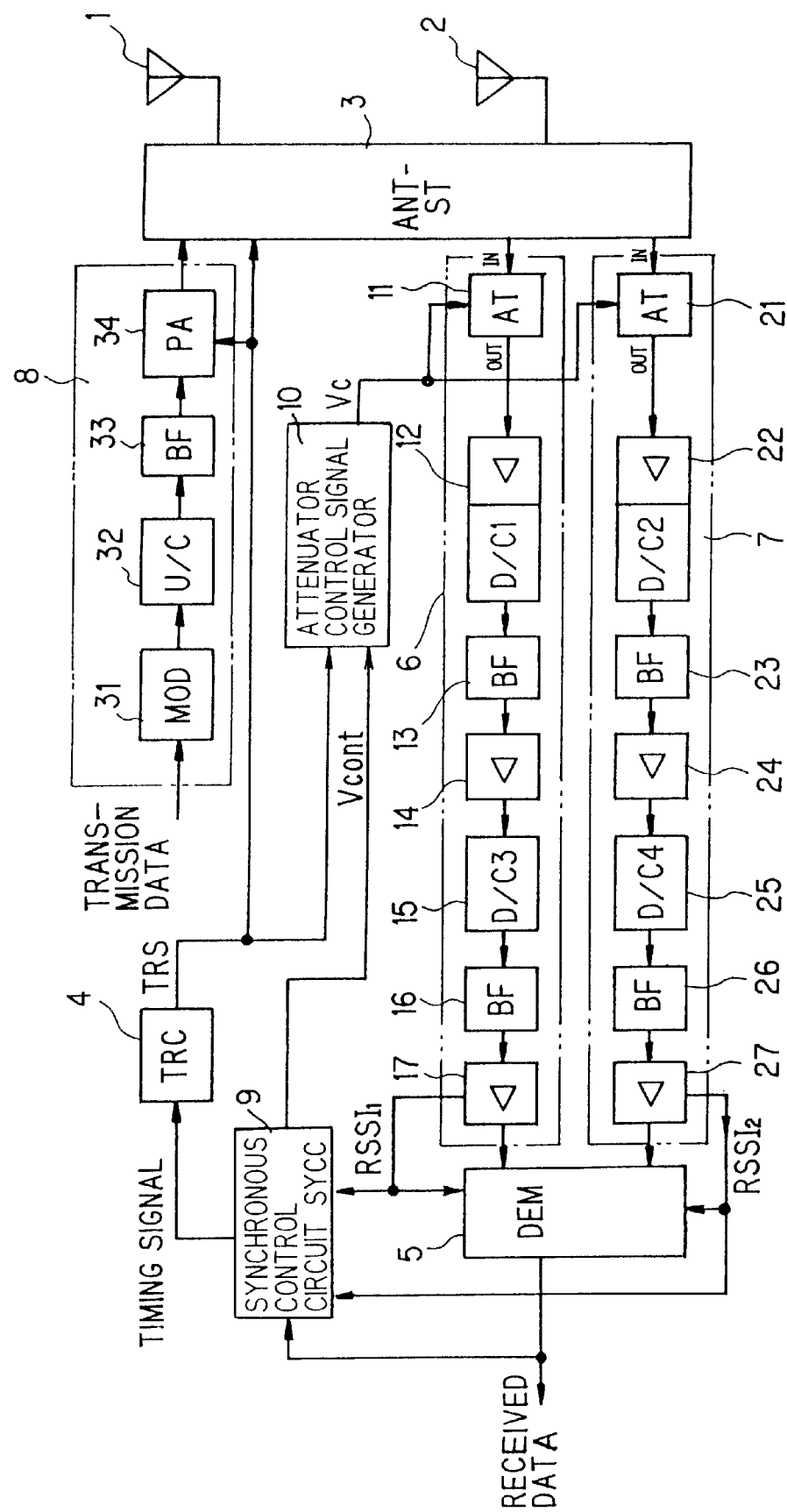
FIG. 20 is a block diagram illustrating a base station transmitter-receiver according to a third embodiment of the present invention.

FIG. 20 is a block diagram illustrating the construction of a base station transmitter-receiver according to the third embodiment of the present invention. Components identical with those of the first embodiment shown in FIG. 3 are designated by like reference characters. This embodiment differs from the first embodiment in that (1) reception signal strengths RSSI1, RSSI2 of the antennas 1, 2 detected by the limiter amplifiers 17, 27, respectively, enter the synchronous control circuit 9, (2) the synchronous control circuit 9 causes a transition from the ordinary reception mode to the synchronous control reception mode automatically when an input larger than a fixed value is detected, and (3) the synchronous control circuit 9 causes a return from the synchronous control reception mode to the ordinary reception mode automatically upon the completion of synchronous control.

Figure 21:
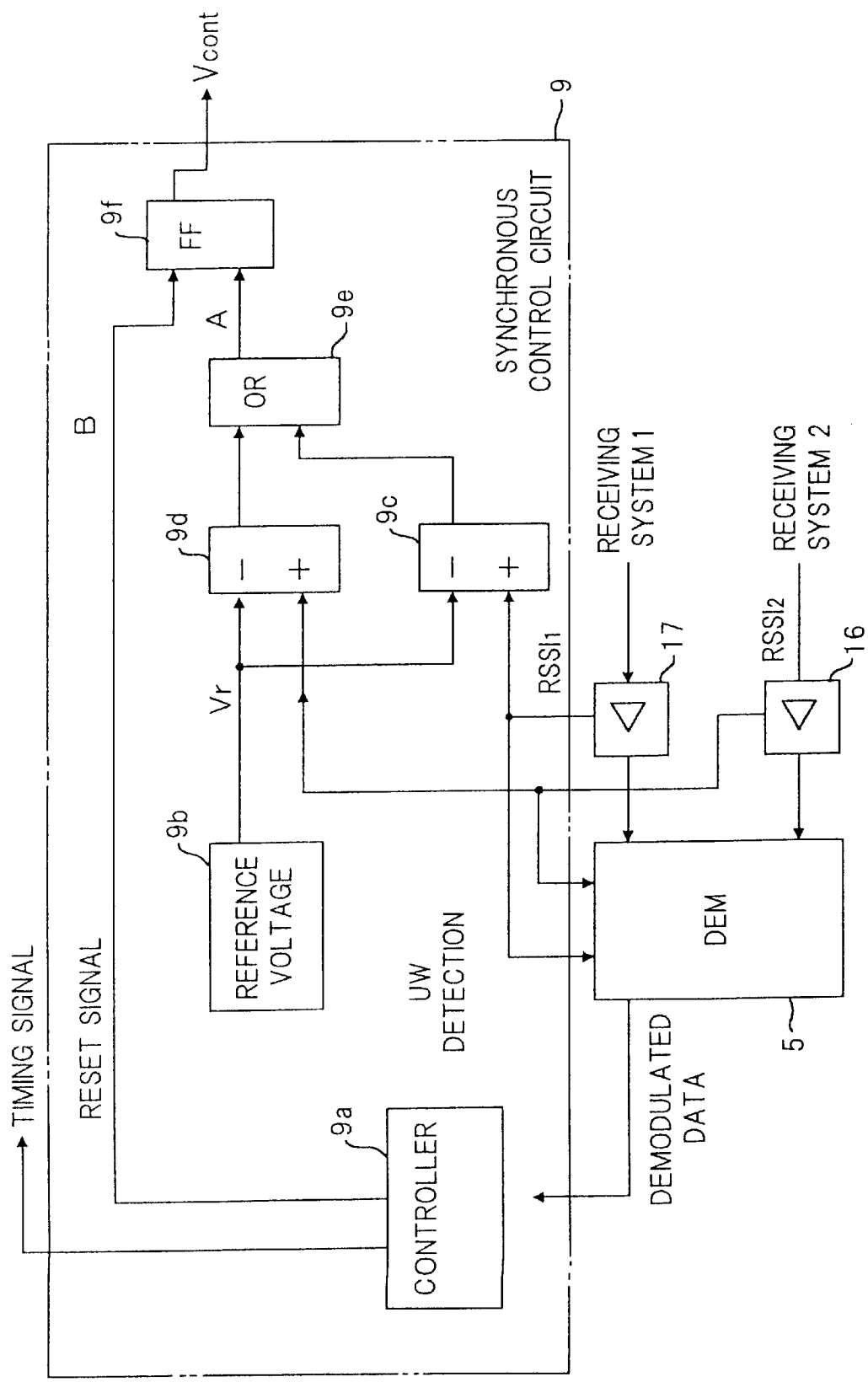
FIG. 21 is a block diagram showing the construction of a synchronous control circuit according the third embodiment.

FIG. 21 is a block diagram showing the construction of the synchronous control circuit 9 according the third embodiment. The circuit 9 includes a controller 9a which executes control for detecting the synchronizing word UW from decoded data, control for generating a timing signal based upon detection of the synchronizing word UW and synchronizing the transmission and reception timing of its own station to that of another base station, and control for generating a reset signal B in response to completion of synchronous control and returning from the synchronous control reception mode to the ordinary reception mode. The circuit 9 further includes a reference voltage generator 9b for generating a reference voltage Vr, comparators 9c, 9d for comparing the reference voltage Vr with the reception signal strengths RSSI1, RSSI2 received from the limiter amplifiers 17, 27, respectively, and for outputting high-level signals when the reception signal strengths RSSI1, RSSI2 are greater than the reference voltage Vr, an OR gate 9e. When one of the reception signal strengths RSSI1, RSSI2 has exceeded the reference voltage Vr, i.e., when a strong signal is has been detected in a reception slot, the OR gate 9e judges that the transmission and reception timings of this station and the other station are not in synchronization and responds by outputting a high-level signal A. A flip-flop 9f (1) is initially in the reset state and outputs the high-level mode changeover signal $V_{CONT}$ at such time to establish the ordinary reception mode, (2) outputs the low-level mode changeover signal $V_{CONT}$ to establish the synchronous control reception mode when one of the reception signal strengths RSSI1, RSSI2 has exceeded the reference voltage, and (3) is reset by a reset signal B, which is output by the controller 9a at completion of synchronous control, to restore the ordinary reception mode.

Figure 22:
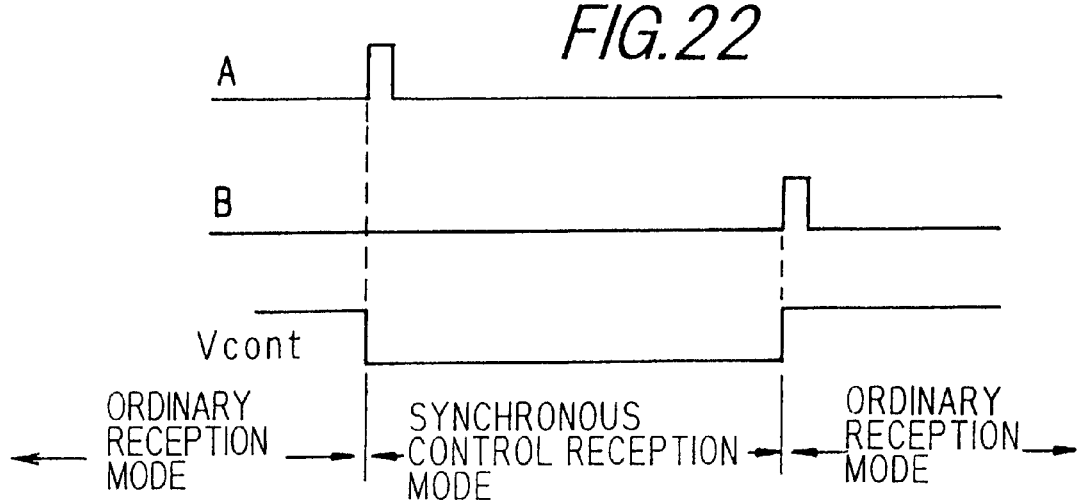
FIG. 22 is an operation timing chart of the synchronous control circuit.

FIG. 22 is an operation timing chart of the synchronous control circuit according to the third embodiment. When one of the reception signal strengths RSSI1, RSSI2 has exceeded the reference voltage Vr and the signal A is generated in the ordinary reception mode ($V_{CONT}$=high level), the flip-flow 9f is set to establish the synchronous control reception mode ($V_{CONT}$=low level.) When the synchronous control reception mode is established, the attenuators 11, 21 (FIG. 20) are placed in the attenuating state. As a result, a strong input signal from another base station is attenuated before entering the demodulator 5, whereupon the demodulator 5 demodulates the received data and inputs the demodulated data to the controller 9a of the synchronous control circuit 9. The controller 9a performs control to detect the synchronizing word UW. If the synchronizing word UW is detected, the controller 9a outputs a transmission and reception timing signal based upon the detection timing and synchronizes the detection timings of this base station and the other base station. Further, the controller 9a generates the reset signal B to reset the flip-flop 9f, whereby the ordinary reception mode ($V_{CONT}$=high level) is restored.

The third embodiment is so arranged that the reception signal strengths RSSI1, RSSI2 enter the synchronous control circuit 9 of the first embodiment. However, the third embodiment can be so constructed that the reception signal strengths RSSI1, RSSI2 enter the synchronous control circuit 9 of the second embodiment (see FIG. 15).

In accordance with the present invention as described above, the transmission and reception timings of two base stations can be established using the air synchronization method. Moreover, since strong input signals from other stations are received upon being attenuated, it is possible to prevent a deterioration in the characteristics of and damage to the low-noise amplifier and to avoid a decline in reception sensitivity.

Further, in accordance with the present invention, since the transmission and reception timing of the base station can be synchronized to that of another station, it is possible to eliminate limitations in terms of locations at which base stations can be deployed, thereby making it possible to deploy base stations effectively.

Further, in accordance with the present invention, it is so arranged that when a strong transmission from a base station that has already set up operations at the same location or in an adjoining location is received, a base station that has been set up later can start operating while synchronizing transmission and reception with the earlier base station. As a result, a plurality of PHS providers can readily increase base stations in the same area and a plurality of base stations can be deployed at one location through use of a wireless local loop to facilitate the accommodation of a large number of subscribers.

As many apparently widely different embodiments of the present invention can be made without departing from the spirit and scope thereof, it is to be understood that the invention is not limited to the specific embodiments thereof except as defined in the appended claims.

What is claimed is:

1. A transmitter-receiver of a base station for repeating transmission and reception modes, transmitting a signal in the transmission mode, and receiving a signal in the reception mode, and establishing synchronization of transmission and reception timing between base stations using air synchronization, said transmitter-receiver comprising:

a transmission power amplifier turned on in the transmission mode for inputting a transmission signal to an antenna and turned off in the reception mode;

a front end for amplifying an antenna reception signal and frequency-converting the signal;

a demodulator provided on an output side of said front end for demodulating data from the reception signal; and attenuating means provided between said front end and the antenna for attenuating the reception signal in a synchronous reception mode, in which mode transmission and reception timing of this base station is synchronized to transmission and reception timing of another base station, and not attenuating the reception signal in an ordinary reception mode.

2. The transmitter-receiver according to claim 1, wherein said attenuating means is a switch, said switch being turned off in the synchronous reception mode.

3. The transmitter-receiver according to claim 1, further comprising:

a signal generator for generating a signal which indicates whether a prevailing mode is the transmission mode or reception mode; and a synchronous controller for controlling changeover between the synchronous reception mode and the ordinary reception mode.

4. The transmitter-receiver according to claim 3, wherein said synchronous controller has:

a reception signal strength detector for detecting reception signal strength;

first mode changeover means which, in the ordinary reception mode, is for comparing reception signal strength and a set value and changing over mode from the ordinary reception mode to the synchronous reception mode when the reception signal strength has exceeded the set value; and second mode changeover means which, in the synchronous reception mode, is for identifying the transmission and reception timing of the other base station from demodulated data and, when the transmission and reception timings of its own base station and of the other base station have been synchronized, for changing over mode from the synchronous reception mode to the ordinary reception mode.

5. The transmitter-receiver according to claim 4, wherein said second mode changeover means identifies the transmission and reception timing of the other base station by detecting a synchronizing word from a signal transmitted by a transmitter-receiver of the other base station in the transmission mode.

6. A transmitter-receiver of a base station for repeating transmission and reception modes, transmitting a signal in the transmission mode and receiving a signal in the reception mode, and establishing synchronization of transmission and reception timings between base stations using air synchronization, said transmitter-receiver comprising:

a transmission power amplifier turned on in the transmission mode and turned off in the reception mode;

a front end for amplifying a reception signal and frequency-converting the signal;

an antenna switch for connecting an antenna to a transmission side in a synchronous reception mode, in which mode transmission and reception timing of this base station is synchronized to transmission and reception timing of another base station, and in the transmission mode, and connecting the antenna to a reception side in an ordinary reception mode;

a demodulator provided on an output side of said front end for demodulating data from the reception signal; and means provided between said front end and said antenna switch for attenuating an input signal in the transmission mode and passing the reception signal in the synchronous reception mode and in the ordinary reception mode.

7. The transmitter-receiver according to claim 6, wherein said attenuating means is a switch, said switch being turned off in the transmission mode and on in the reception mode.

8. The transmitter-receiver according to claim 6, further comprising:

a signal generator for generating a signal which indicates whether a prevailing mode is the transmission mode or reception mode; and a synchronous controller for controlling changeover between the synchronous reception mode and the ordinary reception mode.

9. The transmitter-receiver according to claim 8, wherein said synchronous controller has:

a reception signal strength detector for detecting reception signal strength;

first mode changeover means which, in the ordinary reception mode, is for comparing reception signal strength and a set value and changing over mode from the ordinary reception mode to the synchronous reception mode when the reception signal strength has exceeded the set value; and second mode changeover means which, in the synchronous reception mode, is for identifying the transmission and reception timing of the other base station from demodulated data and, when the transmission and reception timings of its own base station and of the other base station have been synchronized, for changing over mode from the synchronous reception mode to the ordinary reception mode.

10. The transmitter-receiver according to claim 9, wherein said second mode changeover means identifies the transmission and reception timing of the other base station by detecting a synchronizing word from a signal transmitted by a transmitter-receiver of the other base station in the transmission mode.

* * * * *